G. N. LASSWELL, W. E. HOPPER, I. W. CHEELY & W. D. LASSWELL.
LOG LOADER.
APPLICATION FILED JULY 8, 1907.

920,586.

Patented May 4, 1909.
5 SHEETS—SHEET 3.

INVENTORS,
G. N. LASSWELL,
W. E. HOPPER,
I. W. CHEELY AND
W. D. LASSWELL.

G. N. LASSWELL, W. E. HOPPER, I. W. CHEELY & W. D. LASSWELL.
LOG LOADER.
APPLICATION FILED JULY 8, 1907.

920,586.

Patented May 4, 1909.
6 SHEETS—SHEET 5.

UNITED STATES PATENT OFFICE.

GIVEN N. LASSWELL, WILLIAM E. HOPPER, IRVIN W. CHEELY, AND WILLIAM D. LASSWELL, OF CAMPBELL, MISSOURI.

LOG-LOADER.

No. 920,586.          Specification of Letters Patent.          Patented May 4, 1909.

Application filed July 8, 1907. Serial No. 382,727.

*To all whom it may concern:*

Be it known that we, GIVEN N. LASSWELL, WILLIAM E. HOPPER, IRVIN W. CHEELY, and WILLIAM D. LASSWELL, all citizens of the United States, and residents of Campbell, Dunklin county, Missouri, have invented certain new and useful Improvements in Log-Loaders, of which the following is a specification containing a full, clear, and exact description, reference being had to the accompanying drawings, forming a part hereof.

Our invention relates to an apparatus for loading logs on cars, the object of our invention being to construct an apparatus which is normally carried on a car body, and which is adapted to be elevated therefrom by devices arranged at the corners or on the sides of the apparatus, thus permitting the car which normally carries the apparatus and the other cars of a logging train to be drawn beneath the body of the apparatus so that the logging cars can be successively brought into position beneath the boom of the derrick arranged on the end of the apparatus.

Other objects of our invention are as follows:—to arrange means at the corners or on the sides of the apparatus which may be singly or simultaneously moved downward onto the ground at the sides of the track in order to elevate the apparatus a sufficient distance to allow cars to move along the railway track beneath the body of the loader; to arrange means for moving the logging cars in either direction beneath the loader; and to arrange means whereby the hoisting engine located on the body of the loader may be utilized to move the loader itself and the logging cars upon the railway track, thereby dispensing with the services of a locomotive in drawing a logging train from one point to another. To the above purposes, our invention consists in certain novel features of construction and arrangement of parts, which will be hereinafter more fully set forth, pointed out in the claims, and illustrated in the accompanying drawings, in which:—

The car on which the loader is normally carried comprises the side sills 1 and center sills 2 suitably framed together; and arranged in the usual manner upon trucks 3. Journaled in suitable bearings fixed to the under side of the center sills 2 is a shaft 4, which carries a sprocket wheel 5 and a gear wheel 6. Fixed on the axle of one of the trucks is a sprocket wheel 7, and connecting the sprocket wheels 5 and 7 is a sprocket chain 8.

The body of the loader which normally rests on top of the car body just described comprises the side sills 9 and center sills 10, which are framed together by the end sills 11; and extending transversely beneath the ends of the sills 9 and 10 are tie plates 12. Rigidly fixed on the forward end of the loader body so formed, and at the center thereof, is a bearing plate 13, through which is formed a vertically arranged aperture 14; and journaled between the center sills 10, immediately beneath this plate 13, is a vertically disposed grooved pulley 15. Arranged for horizontal rotation on the bearing plate 13 is a base block 16, through which is formed an aperture 17, coinciding with the aperture 14; and seated in the rear portion of the block 16 is the lower end of a derrick post 18, the upper end of which is journaled in a head block 19 carried by the upper end of an A-frame 20, the lower ends of the members of this A-frame being framed to the sills 9 a short distance from the front of the loader. Seated in the forward end of the block 16 is the lower end of a derrick boom 21, the upper end of which is connected to the upper end of the post 18 by a stay 22. Arranged for operation in the lower end of the boom 21 is a grooved pulley 23, the edge of which is in alinement with the apertures 14 and 17; and arranged for operation on top of the boom 21, at the upper end thereof, is a grooved pulley 24, there being an opening 25 formed through the boom immediately beneath said pulley. Arranged for rotation in suitable bearings on the under side of the boom and at the sides of the opening 25 are rollers 26, against which the hoisting cable A bears while in operation.

The posts 27, utilized for supporting the forward end of the loader, when elevated, slide vertically through loops 28 arranged at the outer forward corners of the loader frame, which loops are stayed by suitable braces 29; and the lower ends of these posts are seated in boxes 30, which are provided with broad bases adapted to rest upon the ground, and fixed in said boxes 30 are the lower ends of vertically disposed screw shafts 31, which operate through boxes 32 arranged on the sides of the sills 9 at the forward ends thereof, and said boxes being bolted to the ends of the forward one of the tie plates 12. Arranged in the boxes 32, and operating upon the screw shafts 31, are beveled gear wheels 33, bored and threaded for that purpose and meshing therewith are the beveled gears 34 carried on the outer end of shafts 35, which latter operate in bearings 36 fixed on the sills 9 and 10; and fixed upon each shaft 35 is a gear wheel 37.

The pair of posts 27 at the rear corners of the loader are equipped with the raising and lowering mechanism as just described, with the exception that the loops 28, at the rear end of the machine, are fixed on posts 38 carried by the rear end of the frame, and the shafts 35 are provided with sprocket wheels 39 instead of the gear wheels 37. Arranged for rotation in suitable bearings, immediately to the rear of the shafts 35, are shafts 40, on which are fixed pinions 41, which mesh with the gear wheels 37; and fixed on said shafts 40 are the friction wheels 42.

Journal boxes 43 are arranged to slide longitudinally on top of the sills 9, a short distance to the rear of the shafts 40; and journaled in said sliding boxes are the ends of a shaft 44, on which is fixed a pair of friction pulleys 45, adapted to engage with the friction wheels 42; and also fixed on said shaft 44 is a sprocket wheel 46.

The means for shifting the sliding boxes 43 longitudinally comprises the vertically disposed levers 47, the lower ends of which are fulcrumed to the inside faces of the sills 9, and said levers being pivotally connected to the boxes 43.

Figure 1:
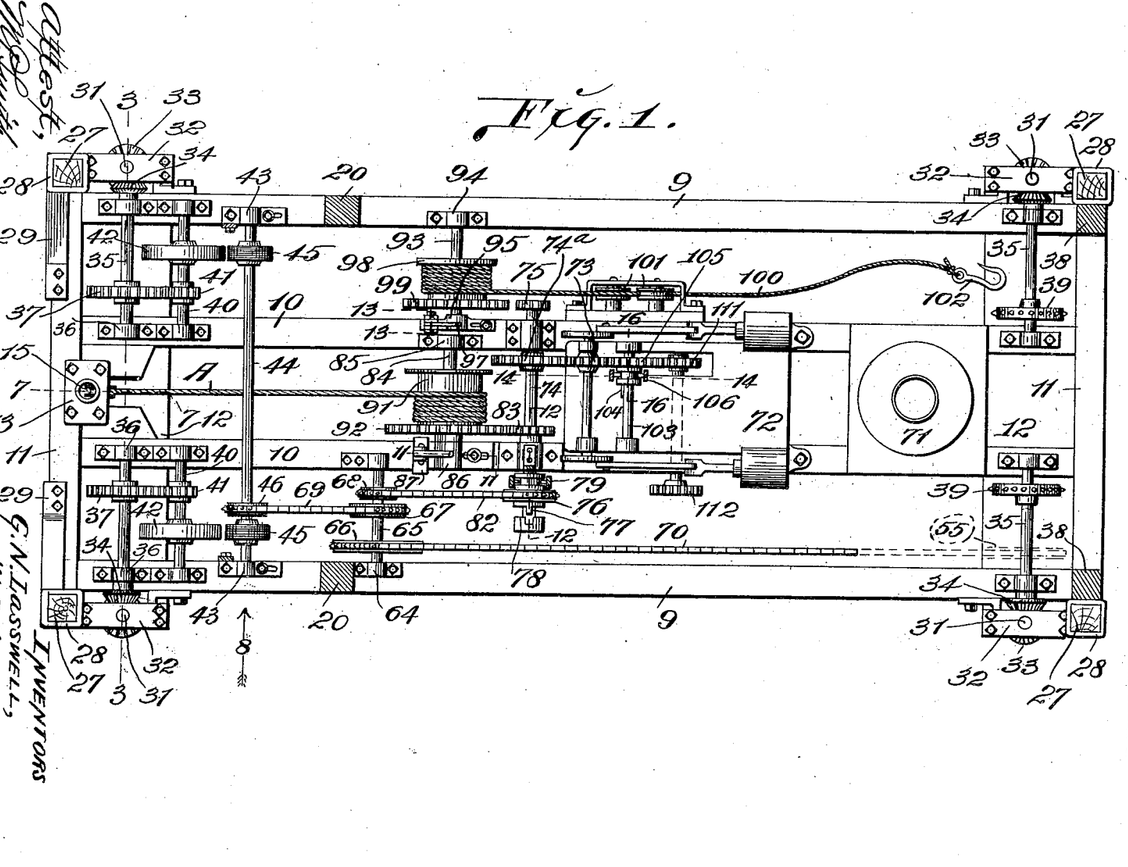
Figure 1 is a plan view of the frame of our improved loader, with parts in section.
Figure 2:
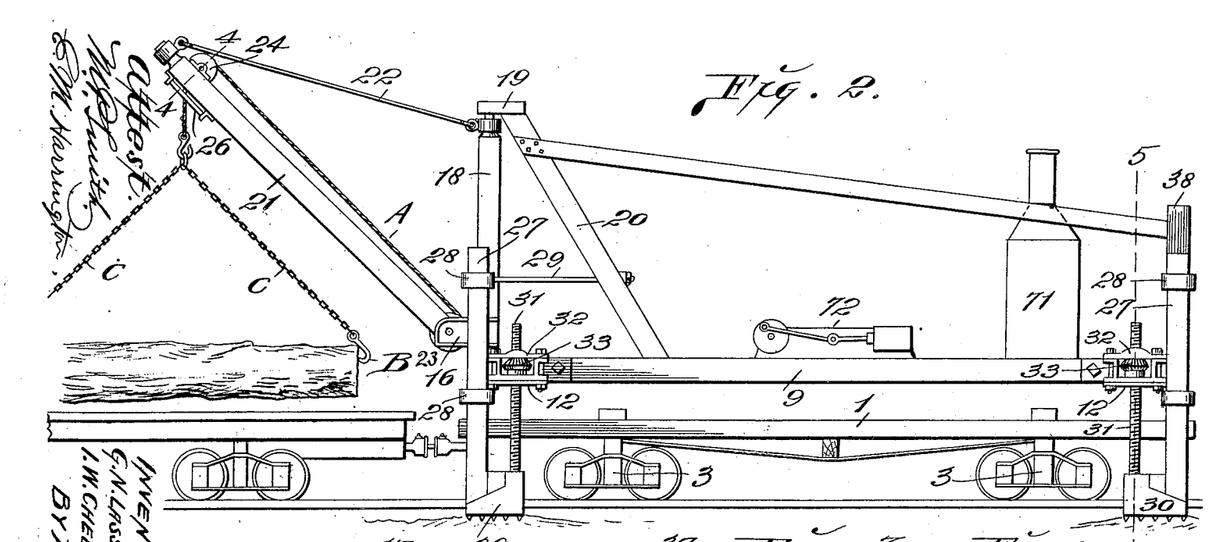
Fig. 2 is a side elevation of the loader, the same being shown in an elevated position to allow the logging cars to pass beneath the body of the loader, and with certain parts of the operating parts of the mechanism not shown.
Figure 3:
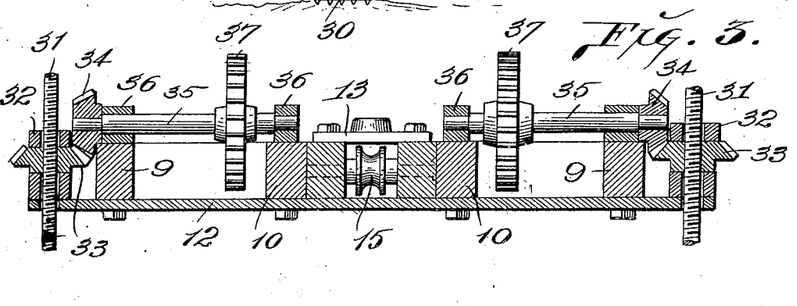
Fig. 3 is an enlarged transverse section taken on the line 3—3 of Fig. 1.
Figure 4:
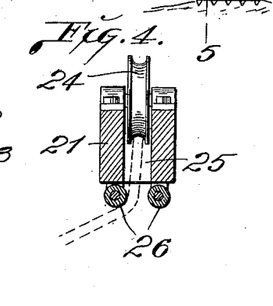
Fig. 4 is an enlarged detail section taken on the line 4—4 of Fig. 2.
Figure 5:
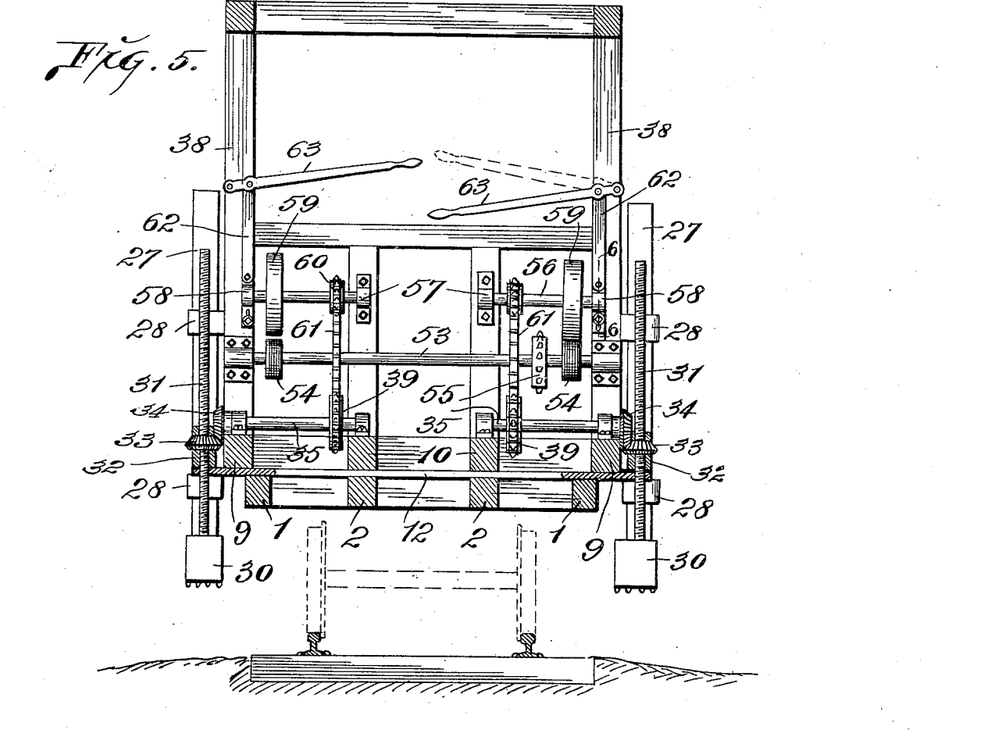
Fig. 5 is an enlarged vertical section taken on the line 5—5 of Fig. 2, and showing the loader lowered onto its car body.
Figure 6:
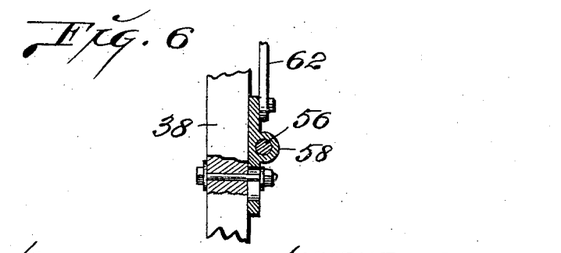
Fig. 6 is a detail section taken on the line 6—6 of Fig. 5.
Figures 7, 8, 9, 10:
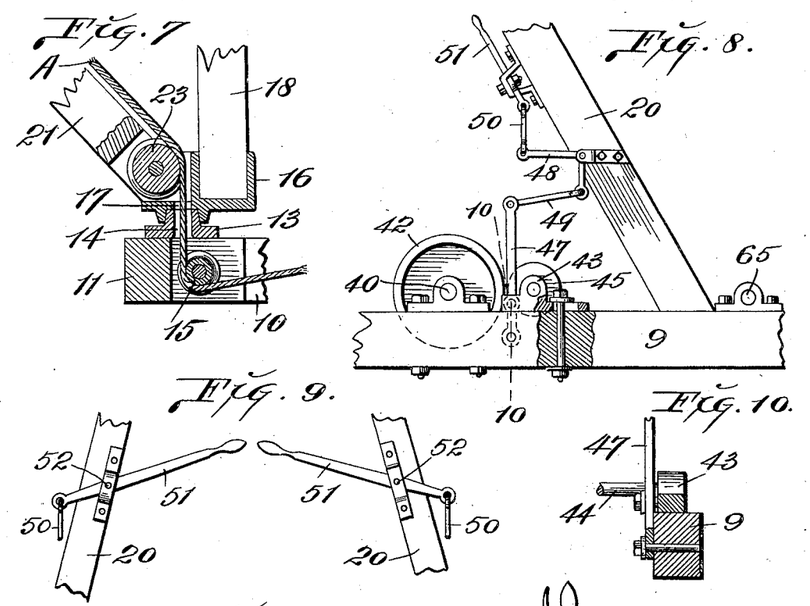
Fig. 7 is an enlarged vertical section taken on the line 7—7 of Fig. 1.
Fig. 8 is an enlarged elevation of the parts seen looking in the direction of the arrow 8, Fig. 1.
Fig. 9 is an elevation of a pair of handles utilized for throwing into operation the mechanism which actuates the forward pair of lifting devices.
Fig. 10 is a detail section taken on the line 10—10 of Fig. 8.

Fulcrumed to the outer face of each member of the A-frame 20 is a bell crank 48, and connected to the lower end of the vertical arm thereof is a link 49, which is pivotally connected to the upper end of the corresponding one of the levers 47. Connected to the upper ends of the horizontal arms of the bell cranks 48 are links 50, the upper ends of which are pivotally connected to the outer ends of hand levers 51, which are fulcrumed at 52 to the front sides of the members of the A-frame 20. (See Fig. 8.) The inner ends of the levers 51 terminate adjacent each other at the center of the loader, where they are conveniently reached for operation.

The mechanism for raising and lowering the screw shafts and posts located at the rear ends of the machine comprises a shaft 53, journaled in suitable bearings arranged on the posts 38; and fixed on said shaft 53 is a pair of friction wheels 54 and a sprocket wheel 55.

A pair of shafts 56 have their inner ends journaled in bearings 57 located on a portion of the frame at the rear end of the loader, and the outer ends of said shafts being journaled in boxes 58 which are arranged to slide vertically on the front faces of the posts 27; and fixed on these shafts 56 are friction wheels 59 which are adapted to engage with the friction wheels 54, and there being sprocket wheels 60 fixed on said shafts 56 which are connected with the sprocket wheels 39 by sprocket chains 61.

Pivotally connected to the upper ends of the sliding boxes 58 are the lower ends of links 62, the upper ends of which are pivotally connected to hand levers 63, the outer ends of which are fulcrumed to the posts 38.

Journaled in bearings 64, on the left hand side of the machine, is a transversely arranged shaft 65, on which are fixed three sprocket wheels 66, 67, and 68. A sprocket chain 69 connects the sprocket wheels 46 and 67, and a sprocket chain 70 connects the sprocket wheel 66 with the sprocket wheel 55. Arranged on the frame of the loader, adjacent the rear end thereof, is a boiler 71, and located adjacent thereto, on the center of the loader, is an engine 72, on the main driving shaft of which is fixed a gear wheel 73. Immediately in front of the engine is located a transverse shaft 74, which operates in bearings suitably located on the center sills 10, and on the right hand end of this shaft is fixed a pinion 75. Arranged to slide on the opposite end of this shaft 74 is a sprocket wheel 76, on the hub of which is formed a clutch face 77 adapted to engage with a corresponding clutch face 78 formed on the outer end of the shaft 74. The sprocket wheel 76 is moved longitudinally upon the shaft 74 by a hand lever 79 fulcrumed at its lower end and provided at its upper end with a latch 80 adapted to engage in suitably located notches in a rack 81. Connecting the sprocket wheels 68 and 76 is a sprocket chain 82, and fixed on the shaft 74, between the sills 10, is a pinion 83. Fixed on the shaft 74 and meshing with the pinion 73 is a gear wheel 74ª.

Figure 11:
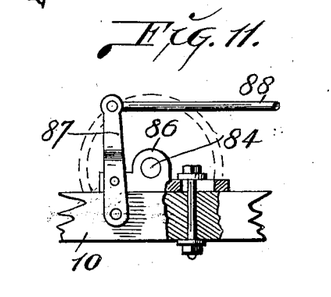
Fig. 11 is a detail section taken on the line 11—11 of Fig. 1.
Figure 12:
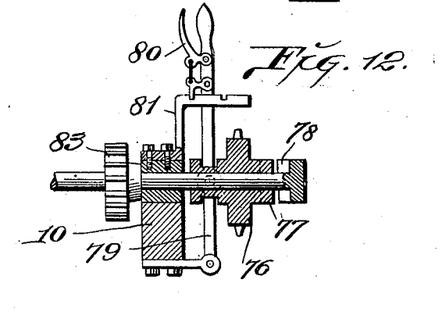
Fig. 12 is a detail section taken on the line 12—12 of Fig. 1.
Figure 13:
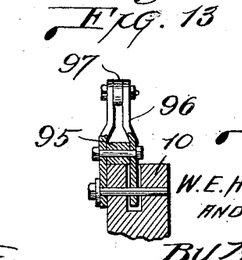
Fig. 13 is a detail section taken on the line 13—13 of Fig. 1.
Figure 14:
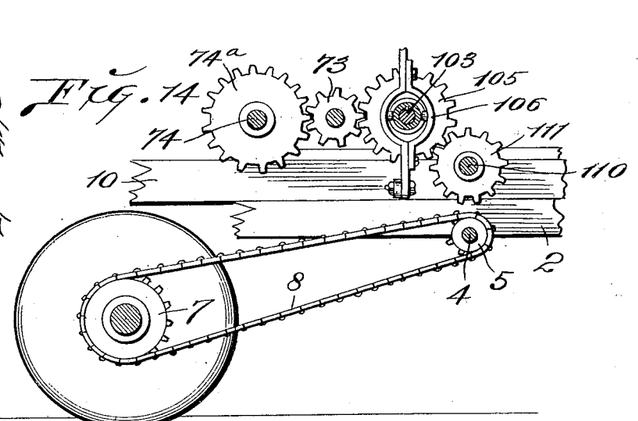
Fig. 14 is an enlarged detail section taken on the line 14—14 of Fig. 1.
Figure 15:
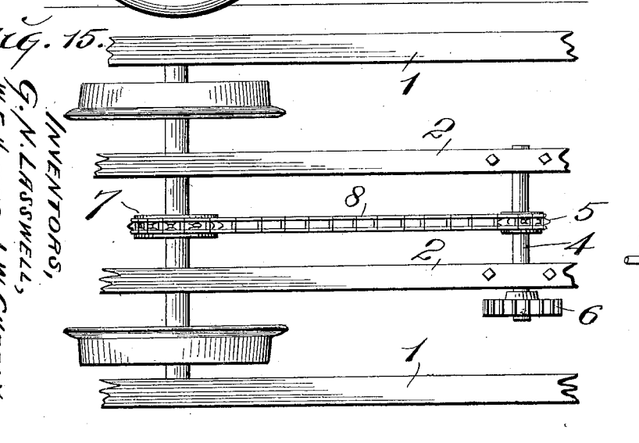
Fig. 15 is a plan view of the driving connection between the body of the loader and the car body which carries said loader.
Figure 17:
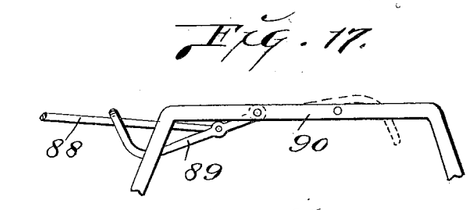
Fig. 17 is an elevation of an operating handle used in shifting sliding journal bearings on the loader.
Figure 18:
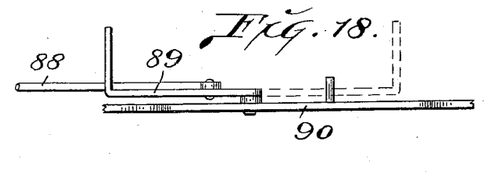
Fig. 18 is a plan view of the parts seen in Fig. 17.

84 designates a shaft which is positioned a short distance in front of the shaft 74, with its right hand end journaled in a fixed bearing 85, and its left hand end being journaled in a sliding bearing 86, and which latter bearing is moved longitudinally by a lever 87 fulcrumed at its lower end to the sill 10, on which said bearing is mounted, the upper end of said lever being connected to a rod 88 which extends rearwardly to a point in front of the engine frame, and being pivotally connected at its rear end to a handle 89, which is in turn pivotally connected to a frame 90. (See Figs. 11, 17, and 18.) Fixed on the shaft 84 is a drum 91, on which winds the hoisting cable A, and fixed on the shaft 84, adjacent the drum 91, is a gear wheel 92, which is adapted to mesh with the pinion 83 when the sliding bearing 86 is moved rearwardly to its limit of movement. Arranged immediately to the right of the shaft 84, and extending between the right hand sills 9 and 10, is a shaft 93, the right hand end of which is journaled in a fixed bearing 94, and the left hand end being journaled in a sliding bearing 95, which is arranged for operation on the right hand one of the sills 10; and said sliding bearing being actuated by a lever 96 fulcrumed at its lower end, and being connected at its upper end to a longitudinally disposed rod 97, which is, in construction and operation, identical with the rod 88. Fixed on the shaft 93 is a winding drum 98, and adjacent thereto is fixed a gear wheel 99, which is adapted to mesh with the pinion 75 when the sliding bearing 95 is at its rearward limit of movement. Adapted to wind on the drum 98 is a cable 100, which passes between a pair of grooved pulleys 101 arranged for operation on the right hand side of the right hand center sill 10, and carried by the end of said cable is a hook 102 which is adapted to be engaged on the logging cars which are drawn beneath the loader.

Figure 16:
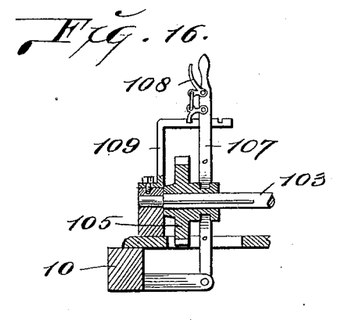
Fig. 16 is an enlarged transverse section taken on the line 16—16 of Fig. 1.

Arranged for rotation in suitable bearings on the engine frame, immediately to the rear of the main driving shaft, is a transversely arranged shaft 103, provided with a key or feather 104, and on which is arranged to slide a gear wheel 105, and which is adapted to mesh with the pinion 73. The hub of the gear wheel 105 is engaged by the yoke 106 of a hand lever 107 fulcrumed at its lower end, and provided at its upper end with a latch 108, which engages in suitably located notches formed in a rack 109. (See Fig. 16.) Journaled in suitable bearings, immediately to the rear of the shaft 103, is a shaft 110, on which is fixed a pinion 111, with which meshes the gear wheel 105 when the latter is in mesh with the pinion 73. Fixed to the left hand end of the shaft 110 is a gear wheel 112, which, when the loader frame is lowered into position on the car adapted to carry the loader, meshes with the gear wheel 6.

The operation of our improved loader is as follows: When it is desired to drive the loader with a series of empty flat cars to the point where said flat cars are to be loaded with logs, the loader occupies its normal position upon its car body, with the gear wheels 6 and 112 in mesh, and with the sliding boxes 86 and 95 moved to their forward limits of movement, thus disengaging the gear wheels 92 and 99 from the pinions 83 and 75; and with the sprocket wheel 76 moved so as to disengage the clutch face 77 from the clutch face 78. The hand lever 107 is now manipulated to throw the gear wheel 105 into mesh with the pinions 111; and, when the engine is started, the rotary motion of the engine shaft is transmitted by means of the meshing gears and pinions 74ª, 73, 105, 111, 112, and 6 to the shaft 4; and from thence to the car axle by the sprocket chain 8; and, in this manner, the loader and empty cars are driven along the track to the point desired. When the point has been reached where the logs are to be loaded, the posts 27 are lowered to the ground and the loader frame is raised on said posts to allow the empty cars to be drawn beneath the loader frame in the following manner: The gear wheel 105 is disconnected from the pinions 73 and 111 by actuating the hand lever 107, after which the sprocket wheel 76 is shifted on the left hand end of the shaft 74 so as to bring the clutch faces 77 and 78 together. The engine is now started and the rotary motion of the engine shaft is transmitted to the shaft 74 by means of the gear wheel 74ª, and the sprocket wheel 76, rotating with the shaft 74, owing to an engagement of the clutch faces 77 and 78, drives the sprocket chain 82 and rotary motion is thus imparted to the shaft 65. In turn rotary motion is imparted to the shafts 44 and 53 by means of the sprocket chains 69 and 70, which chains pass respectively around the sprocket wheels 67 and 46, and 66 and 55. Operators stationed at each end of the loader frame now manually engage the hand levers 51 and 63 and pull downwardly thereon, which action, by means of the various connections, causes the sliding boxes 43 to move forward, and at the same time the sliding boxes 58 are moved downward, thus causing the pair of friction wheels 45 to be brought into engagement with the pair of friction wheels 42; and in a like manner the friction wheels 59 will be brought into engagement with the friction wheels 54. The rotary motion thus imparted to the shafts 40 is transmitted to the shafts 35 by means of the meshing pinions 37 and 41, and the rotary motion of the shafts 56 is imparted by means of the chain 61 to the shafts on which the sprocket wheels 39 are fixed, and which last mentioned shafts drive the beveled gearing utilized for raising and lowering the rear pair of screw shafts 31. The beveled pinions 34 drive the pinions 33, and the same operating on the screw shafts 31 cause the same to move downward through the boxes 32; and following this action, the posts 27 are likewise moved downward through the loops 28. The operators by properly manipulating the hand levers 51 and 63 can throw in and out the friction driving gear as desired, thereby accurately controlling the lowering of the posts 27; and when the frame of the loader is elevated, it can be brought to a perfect level by the proper manipulation of the handles. When the blocks 30 engage on the ground at the sides of the track, the further downward movement of the screw shafts 31 and posts 27 will cause the body of the loader to rise from its car body and be elevated to such a distance as that said car body and the empty logging cars can readily be moved beneath the frame of the loader.

After the loader has been elevated to a sufficient degree, the handle 79 is manipulated to shift the sprocket wheel 76, thereby disengaging the clutch faces 77 and 78, thus throwing the elevating mechanism out of operation, and the hook 102 is now carried to the rear end of the loader car and engaged thereon. The log hooks B, at the lower end of the chains C, which are detachably carried by the ends of the hoisting cable A, are now carried forward to the forward one of the empty cars; and in so doing, the cable A will unwind from the drum 91. The hooks are engaged on the forward one of the empty cars, and the operator on the loader now brings the handle 89 rearward to its limit of movement, thus imparting a corresponding movement to the rod 88, and moving the journal bearing 86 rearward until the gear wheel 92 meshes with the pinion 83. The operator now starts the engine, and the rotary motion imparted to the shaft 74 is in turn imparted to the shaft 84 and drum 91, and, as the same rotates, the hoisting cable A will be wound thereon; and, in so doing, the empty cars will be drawn along beneath the loader from the front to the rear until the forward one of the cars is in a position immediately beneath the boom 21; and, during this action, the cable 100 will unwind from the drum 98 and lie immediately on top of the loader car and empty logging cars which are now to the rear of the loader. The hooks B are now detached from the forward one of the empty cars, and the boom 21 is swung to one side of the track or the other in order that said hooks may be readily engaged on the ends of a log lying upon the ground alongside the track. If the log be located some distance away from the track, the engineer may reverse the engine so as to permit the drum 91 to rotate in the proper direction to allow the cable A to unwind therefrom during the time said cable is drawn toward the log. After the hooks B have been engaged in the ends of the log, the operator starts the engine so as to wind the cable upon the drum, and the log will be drawn toward the first empty car; and, after being elevated thereover, is allowed to lower in position thereon. The post 18 and boom 21 of the derrick readily swing from one side to another; and, in so doing, the block 16 rotates upon the plate 13; and when a portion of the cable A extends sidewise from the outer end of the boom 21, it will bear on the rollers 26, which prevent the boom at the sides of the opening 25 from becoming worn.

When the proper number of logs have been loaded on the first car, the operator shifts the sliding box 86 by actuating the handle 89, thus disconnecting the gear 92 from the pinion 83, after which the sliding box 95 is drawn to its rearward limit of movement by actuating the handle connected to the rod 97, which action brings the gear wheel 99 into mesh with the pinion 75. The engine is now started, and the rotary motion imparted to the shaft 93 causes a portion of the cable 100 to wind upon the drum 98, which action moves the loaded car away from its position in front of the loader, and brings an unloaded car into position to be loaded. These operations are continued until all of the empty cars are loaded, and finally the loader car is brought into position immediately beneath the loader, and by properly manipulating the friction driving gear, the loader frame is allowed to lower onto the loader car; and the continued movement of the raising and lowering mechanism elevates the screw shafts 31 and the posts 27 until the blocks 30 are a sufficient distance above the track.

When the loader is lowered onto the loader car, the gear wheel 112 meshes with the gear wheel 6; and when the various parts are properly positioned and the engine started, the loader and the train of loaded cars are moved along the track to the point where the logs are to be unloaded. By arranging each pair of screw shafts 31 and posts 21 to move independently, the body of the loader can be elevated and brought to a level position regardless of the unevenness of the ground on which the blocks 30 engage. The blocks 30 at the lower ends of the posts 27 occupy positions entirely outside the ties of the track; therefore giving a broad base for the loader to stand on while in operation, and the boom 21 can be readily swung from one side of the track to the other, thus readily loading from both sides of the track.

While our improved apparatus is particularly adapted for loading logs, it will be readily understood that stone, utilized for building purposes, and earth, sand, or coal, may be readily loaded onto the flat cars; and, where small material is so loaded, it will be necessary to arrange a suitable container on the end of the hoisting cable A.

Thus it will be seen how we have provided an improved apparatus which handles a logging train with comparative ease, without the use of a locomotive, brings the empty cars into position to be loaded, and very rapidly lifts the logs from alongside the track and positions the same on the cars.

We claim:—

1. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, and independently operating means arranged on the loader frame and engaging each screw shaft for raising and lowering the posts relative the loader frame.

2. In an apparatus of the class described, a truck, a loader frame carried thereby, pairs of vertically alined loops fixed on the corners of the loader frame, posts arranged to slide vertically through the pairs of loops, vertically disposed screw threaded shafts fixed at their lower ends to the lower ends of the posts, and independently operating means arranged on the loader frame and engaging the screw shafts for raising and lowering the posts relative the loader frame.

3. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, means arranged on the loader frame and engaging the screw shafts for raising and lowering the posts relative the loader frame, and a derrick arranged on the loader frame.

4. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, means arranged on the loader frame and engaging the screw shafts for raising and lowering the posts relative the loader frame, a motor arranged on the loader frame, and a driving connection from the motor to one of the axles.

5. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, means arranged on the loader frame and engaging the screw shafts for raising and lowering the posts relative the loader frame, a motor arranged on the loader frame, a driving connection from the motor to one of the axles, and a derrick carried by the loader frame.

6. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, means arranged on the loader frame and engaging the screw shafts for raising and lowering the posts relative the loader frame, a motor arranged on the loader frame, a driving connection from the motor to one of the axles, a derrick carried by the loader frame, and means actuated by the motor for operating the derrick.

7. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, means arranged on the loader frame and engaging the screw shafts for raising and lowering the posts relative the loader frame, and means arranged on the loader frame for propelling the same and the truck over a track.

8. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, means arranged on the loader frame and engaging the screw shafts for raising and lowering the posts relative the loader frame, means arranged on the loader frame for propelling the same and the truck over a track, and means carried by the loader frame for moving the cars along the track beneath the loader frame when the same is elevated.

9. In an apparatus of the class described, a truck, a loader frame carried thereby, pairs of vertically alined loops fixed on the corners of the loader frame, posts arranged to slide vertically through the pairs of loops, vertically disposed screw threaded shafts located adjacent the posts, a metal box rigidly fixed to the lower end of each post and to the lower end of the adjacent shaft, means arranged on the loader frame and engaging the screw shafts for raising and lowering the posts relative the loader frame, means arranged on the loader frame for propelling the same and the truck over a track, means carried by the loader frame for moving the cars along the track beneath the loader frame when the same is elevated, and a derrick arranged on the loader frame.

In testimony whereof, we have signed our names to this specification, in presence of two subscribing witnesses.

GIVEN N. LASSWELL.
    WILLIAM E. HOPPER.
    IRVIN W. CHEELY.
    WILLIAM D. LASSWELL.

Witnesses:
    L. S. Lancaster,
    A. E. Diamond.